United States Patent [19]

Scott

[11] 3,794,071

[45] Feb. 26, 1974

[54] BALL TYPE BRAKE CYLINDER RETAINER VALVE

[75] Inventor: Daniel G. Scott, Apollo, Pa.

[73] Assignee: Westinghouse Air Brake Company, Wilmerding, Pa.

[22] Filed: July 27, 1972

[21] Appl. No.: 275,459

[52] U.S. Cl....... 137/599.2, 137/625.3, 137/625.32, 303/79, 251/363, 251/297
[51] Int. Cl............................................. F16k 11/10
[58] Field of Search....... 137/614.2, 625.46, 614.14, 137/599.1, 599.2, 625.29, 625.3, 625.32; 251/309, 310, 316, 183, 181, 185, 207, 297, 363; 303/75, 76, 77, 78, 79

[56] References Cited
UNITED STATES PATENTS

| R27,514 | 10/1972 | Billeter | 137/599.2 |
|---|---|---|---|
| 3,653,406 | 4/1972 | Racki | 137/599.2 |
| 3,532,117 | 10/1970 | Racki | 303/79 X |
| 872,116 | 11/1907 | Ferguson | 303/76 |
| 991,968 | 5/1911 | Gale | 137/614.2 X |
| 3,192,948 | 7/1965 | Anderson et al. | 251/310 X |
| 2,471,941 | 5/1949 | Downey | 251/310 |
| 1,827,470 | 10/1931 | Harrison et al. | 137/614.2 X |
| 900,989 | 10/1908 | Eddy | 137/614.2 X |
| 517,707 | 4/1894 | O'Leary | 137/614.2 |

Primary Examiner—Samuel Scott
Assistant Examiner—Ira S. Lazarus
Attorney, Agent, or Firm—Ralph W. McIntire, Jr.; W. F. Poore

[57] ABSTRACT

This invention relates to a three-position sealed ball-type brake cylinder pressure retaining valve device, for connection to the exhaust passageway of a railway vehicle brake control valve device. This retaining valve device has a body that is provided at one end with a securing flange. Extending into the body from the other end thereof is a bore that is coaxial with the smaller of a pair of counterbores, the axis of the larger being off-set therefrom. In the larger of these counterbores is disposed a removable cartridge which has formed integral with one end thereof a pair of diametrically arranged arcuate-shaped legs that extend into the smaller counterbore to the end thereof. A pair of diametrically arranged ported resilient arcuate-shaped seal members are disposed in the smaller counterbore between the arcuate-shaped legs and in surrounding sealing relation to a ball-type valve element that has integral therewith a valve stem which extends through the bore in the body for receiving on its outer end a handle manually movable in a plane parallel to the flange selectively to any one of three positions. Extending into the cartridge from its one end is a passageway of small diameter so as to constitute a choke that opens into the smaller of a plurality of coaxial counterbores in one of which is carried an annular valve seat member against which a check valve is normally biased by a spring interposed between the check valve and one end of another of the plurality of counterbores, the check valve thus being arranged in series relation with the choke. The ball-type valve element has therein a plurality of angularly spaced intersecting passageways, one of which is of such size as to constitute a choke, that open at one end at its spherical surface. These passageways of different flow capacity, in cooperation with one another and with either a passageway in the body that at one end opens into the smaller counterbore in this body in alignment with a port in one of the seal members and at the other registers with an arcuate cavity provided in the cartridge and open to the face of the flange via a strainer device, or the check valve, are effective in three respective positions of the ball-type valve element to selectively provide a fast blow-down of brake cylinder pressure to atmosphere, a slow blow-down to a chosen pressure above atmospheric pressure, and a slow blow-down to atmosphere.

12 Claims, 9 Drawing Figures

3,794,071

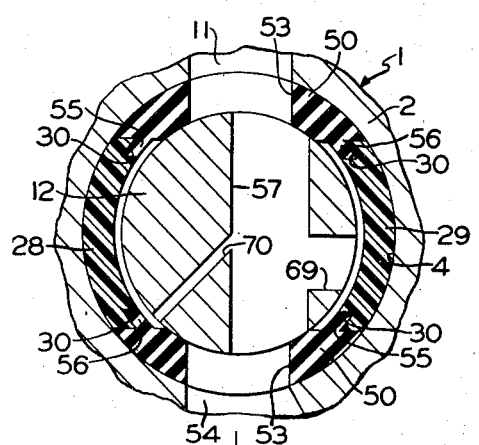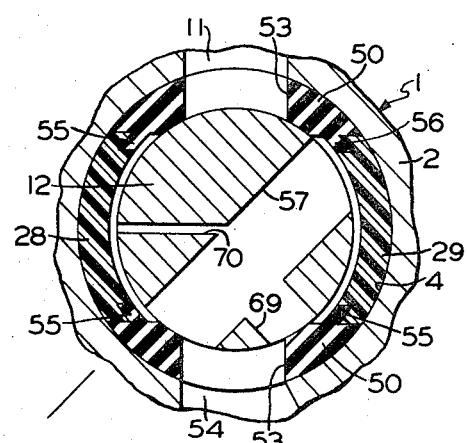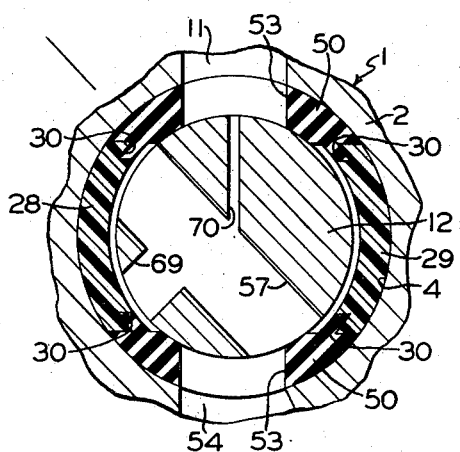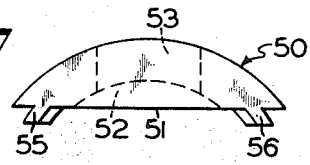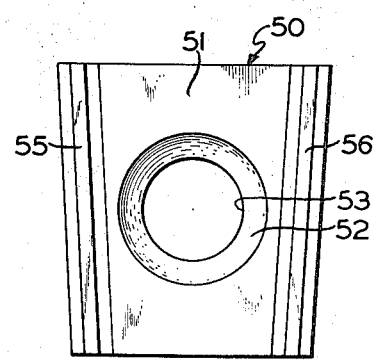

BALL TYPE BRAKE CYLINDER RETAINER VALVE

BACKGROUND OF THE INVENTION

In U.S. Pat. No. 3,653,406, issued Apr. 4, 1972 to Francis R. Racki and assigned to the assignee of the present application, there is shown and described a three-position ball-type brake cylinder pressure retaining valve device in which the ball-type valve element has a stepped bottomed bore extending inward from its spherical surface, in which bore is a spring-biased check valve. This valve element is provided therein with a plurality of angularly spaced passageways and orifices opening at one end at its spherical surface and at the other either into another passageway also opening at one end at this spherical surface or into the stepped bottomed bore. It is apparent that the manufacturing cost of a ball-type retaining valve device in which a plurality of passageways and a check valve are embodied in the ball valve element is in excess of the cost of such a ball-type retaining valve device wherein no check valve and a minimum of passageways are provided in the ball valve element.

Accordingly, it is the general purpose of this invention to provide an improved, novel, compact, tamperproof three-position ball-type brake cylinder pressure retaining valve device that comprises a ball-type valve element encased by a pair of ported resilient members forming a seal therewith.

SUMMARY OF THE INVENTION

According to the present invention, a novel, tamperproof, three-position brake cylinder pressure retaining valve device is provided comprising a valve body that has a bore which is coaxial with one of a pair of tapered off-set counterbores in the smaller of which a removable ball-type valve element is encased by a pair of diametrically arranged ported resilient arcuate seal members the outer surface thereof abutting the wall surface of the resepctive counterbore and the inner surface a portion of the spherical surface of the valve element. Between each pair of adjacent edges of the two seal members, and having a tongue and groove engagement with each respective edge, is one of a pair of arcuate-shaped legs, the outer surface of which also abuts the wall surface of the respective counterbore. These legs are formed integral with one end of an annular cartridge member that is disposed and retained in the other of the pair of counterbores. This cartridge member is provided with a choke and carries a spring-biased check valve so arranged with respect to the choke as to control therewith serial flow of fluid under pressure therethrough to passageways in the ball valve element that are open to atmosphere via passageways in the valve body in registry therewith in the different positions of the ball valve element. In one position of this valve element one of the passageways therein, in cooperation with the ports in the seal members and a pair of the passageways in the valve body, provide for a direct unrestricted flow of fluid under pressure to atmosphere in parallel to the serial flow thereto through the check valve and choke.

Integral with the ball-type valve element is a stem that extends through the bore in the valve body and receives thereon a handle for manually turning the valve element to any one of three different positions so as to selectively provide a fast blow-down of brake cylinder pressure to atmospheric pressure, a slow blow-down of brake cylinder pressure past the check valve to a chosen pressure above atmospheric pressure corresponding to the loading bias on the check valve, and a slow direct blow-down of brake cylinder pressure to atmospheric pressure.

FIG. 5 is a partial cross-sectional view, on an enlarged scale, showing a ball valve element of this brake cylinder pressure retaining valve device occupying its first position in which an unrestricted and direct communication is established between a brake cylinder device and atmosphere in parallel relation to a restricted communication having a check valve disposed therein in series relation thereto.

FIG. 6 is a partial cross-sectional view, on an enlarged scale, with the ball valve element shown in the second of its three positions in which a chosen pressure is retained in a brake cylinder device.

FIG. 7 is a partial cross-sectional view, on an enlarged scale, with the ball valve element shown in the third of its three positions in which a restricted communication is established between a brake cylinder device and atmosphere.

FIG. 8 is a top or plan view of one of a pair of arcuate-shaped seal members embodied in the brake cylinder pressure retaining valve device.

FIG. 9 is a front elevational view of the arcuate-shaped seal member disclosed in FIG. 8 showing a pair of tongues or tabs that protrude from a flat surface on the seal member and extend from one end to the other thereof.

Figure 1:
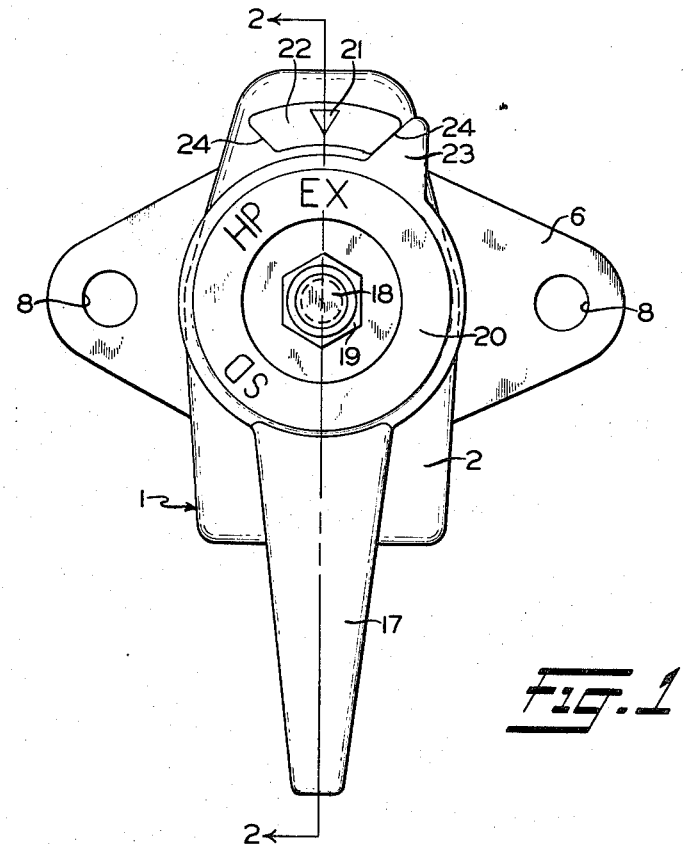
FIG. 1 is a front elevational view showing a three-position brake cylinder pressure retaining valve device constructed in accordance with the invention.
Figure 2:
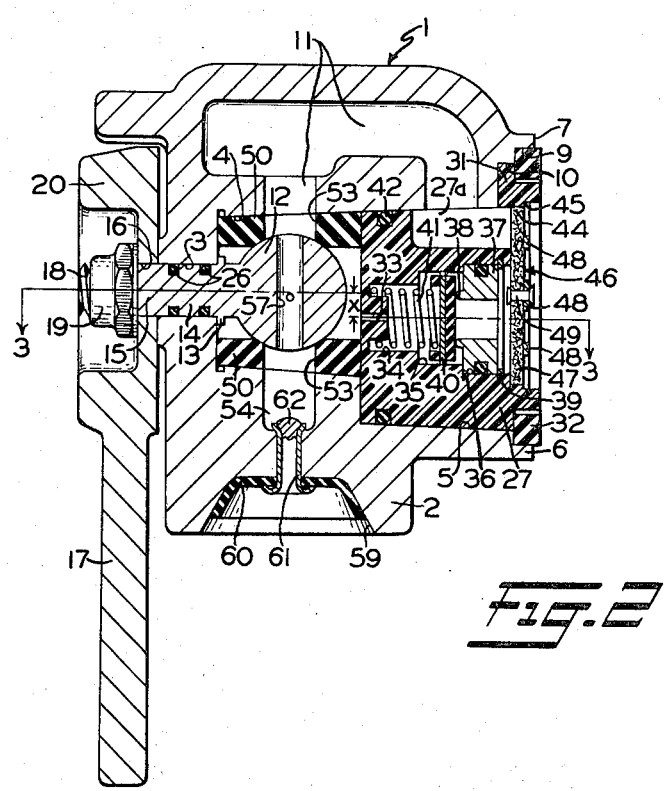
FIG. 2 is a vertical cross-sectional view, taken along the line 2—2 of FIG. 1 and looking in the direction of the arrows, showing certain structural details of this valve device.
Figure 3:
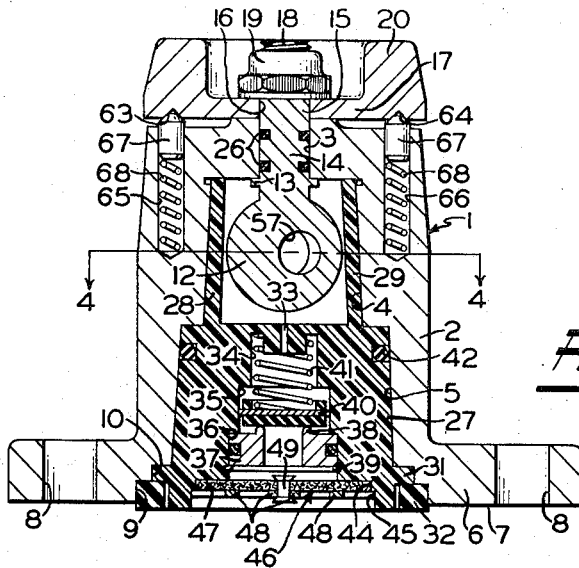
FIG. 3 is a vertical cross-sectional view, taken along the line 3—3 of FIG. 2 and looking in the direction of the arrows, showing structural details of detent means for retaining the operating handle of the retaining valve device against movement by vibration from any one of its three positions.

As shown in FIGS. 1 to 7, inclusive, a three-position brake cylinder pressure retaining valve device 1 comprises a casing 2 having therein a bore 3 which, as shown in FIGS. 2 and 3, opens at its inner end into a coaxial tapered counterbore 4. As best shown in FIG. 2 of the drawings, the counterbore 4 at its right-hand end opens into a second tapered counterbore 5 the axis of which is off-set from the axis of the counterbore 4 a distance X, it being noted that the counterbore 4 is tangent to the counterbore 5, which is to say that the circumferences of the two circles formed at the adjacent ends of these counterbores have a single point in common.

Figure 4:
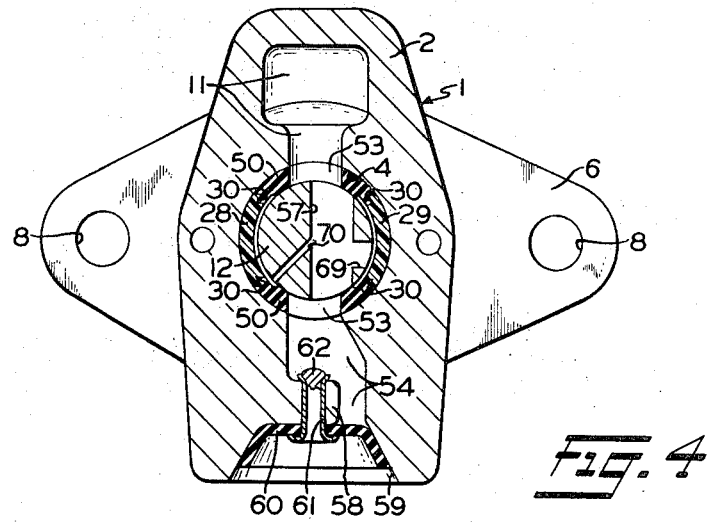
FIG. 4 is a cross-sectional view, taken along the line 4—4 of FIG. 3 and looking in the direction of the arrows, showing further structural details of the three-position brake cylinder pressure retaining valve device not made apparent in FIGS. 2 and 3.

As is apparent from FIGS. 2 and 3, formed integral with the casing 2 is a flange 6 having a flanged fitting face 7 that abuts a corresponding face formed on a pipe bracket (not shown) that is secured to the body of a railway vehicle by any suitable means. This pipe bracket has connected thereto one end of a brake cylinder exhaust pipe (not shown) that has its opposite end connected to the exhaust port of the usual fluid pressure operated brake control valve device (not shown) which is provided on each vehicle in a train. As shown in FIGS. 1, 3 and 4, the flange 6 is provided with two spaced-apart smooth bores 8 for receiving, for example, cap screws (not shown) to secure the flange 6 to the pipe bracket.

The above-mentioned one end of the brake cylinder exhaust pipe is disposed in a bore (not shown) in the pipe bracket which bore is coaxial with two counterbores 9 and 10 (FIGS. 2 and 3) of unequal diameter formed in the casing 2, it being noted that these counterbores are off-set the distance X from the counterbore 5 that is connected to the tapered bore 4 in this casing 2 by a passageway 11 also formed in the casing.

As shown in FIGS. 2, 3 and 4, a spherical or ball-type valve element 12 is disposed in the counterbore 4. One end of this valve element 12 has formed integral therewith a collar 13 that abuts the smaller end of the tapered counterbore 4 and a valve stem 14 that extends through the bore 3 to the exterior of the casing 2. That part of the valve stem 14 exterior of the casing 2 is provided with a square portion 15 that extends through a square hole 16 in a handle 17 and with a screw-threaded portion 18 that has screw-threaded engagement with a nut 19 which retains the handle 17 on the square portion 15 of the valve stem 14.

As shown in FIGS. 1 and 2, formed integral with the handle 17 and concentric with the valve stem 14 is an annular member 20 on which is cast or stenciled three arcuately spaced-apart indicia EX, HP and SD denoting exhaust, high pressure and slow direct positions of the valve element 12 accordingly as a pointer 21 (FIG. 1) formed on a lug 22 cast integral with the casing 2 overlies EX, HP or SD in response to clockwise turning, as viewed in FIG. 1, of the handle 17. A lug 23 formed integral with the annular member 20 abuts a first stop surface 24 formed on the right side of lug 22 while the handle 17 occupies its direct exhaust position shown in FIG. 1 thereby limiting further counterclockwise turning of this handle. A second stop surface 24 formed on the left-hand side of the lug 22 abuts the handle 17 while the pointer 21 overlies SD on member 20 thereby limiting clockwise turning of this handle 17.

As shown in FIGS. 2 and 3, the valve stem 14 is provided with a pair of spaced-apart peripheral annular grooves in each of which is disposed an O-ring seal 26 that forms a seal with the wall surface of the straight bore 3 to prevent leakage of fluid under pressure from the passageway 11 and the interior of counterbore 4 to atmosphere along the periphery of the valve stem 14.

As best shown in FIG. 3, a removable annular tapered cartridge member 27 that may be constructed of some suitable plastic material is disposed in the tapered counterbore 5, the axis of which bore, as hereinbefore mentioned, is off-set from the axis of the counterbore 4. Formed integral with the upper end, as viewed in FIG. 3, of the cartridge member 27 is a pair of frusto-conical arcuate-shaped legs 28 and 29. These legs are so tapered and disposed as to extend into the tapered counterbore 4 and abut the upper end thereof, as shown in FIG. 3. The arcuate length of the legs 28 and 29 is shown in FIG. 4, it being noted from this figure that these legs are diametrically arranged one from the other and that a V-notch 30 is provided at each end of their arcuate length, this notch extending from one end to the other of the respective leg.

The right-hand end, as viewed in FIG. 2, of the cartridge member 27 has formed integral therewith a flange 31, the center line of this flange being off-set the distance X from the center line of the cartridge member 27 and the diameter being substantially the same as the diameter of the hereinbefore-mentioned counterbore 10 thereby enabling this flange to be disposed in this counterbore 10 and retained therein by a resilient gasket ring 32 that is disposed in the hereinbefore-mentioned counterbore 9 and forms a seal between the flange fitting face 7 on the flange 6 and the abutting corresponding face formed on the pipe bracket when the retaining valve device 1 is secured to this pipe bracket by the above-mentioned cap screws that secure this valve device 1 to the pipe bracket.

Extending downward, as viewed in FIG. 3, from the upper end of the cartridge member 27 is a bore 33 of such small diameter as to constitute a choke that opens into a coaxial counterbore 34 that is coaxial with a second counterbore 35 of larger diameter and a third counterbore 36 the diameter of which exceeds that of the counterbore 35.

Disposed in the counterbore 36 is an annular check valve seat member 37 having at its upper end, as viewed in FIG. 3, an annular valve seat 38. This valve seat member 37 is retained in abutting relationship with the shoulder formed by the upper end, as viewed in FIG. 3, of the counterbore 36 by a snap ring 39 that is inserted in a groove formed in the wall surface of the counterbore 36.

Disposed in the counterbore 35 is a disc-shaped check valve 40 that is normally biased against the annular valve seat 38 by a spring 41 which is interposed between this check valve 40 and a shoulder formed by the upper end of the counterbore 34.

Adjacent its upper end, as viewed in FIG. 3, the cartridge member 27 is provided with a peripheral annular groove in which is disposed an O-ring seal 42 that forms a seal with the wall surface of the counterbore 5 to prevent leakage therepast of the fluid under pressure that flows to the passageway 11 while the ball valve element 12 occupies its high pressure position.

As best shown in FIG. 2, the cartridge member 27 is provided with a cavity 27a that registers with one end of the passageway 11 and with the smaller of a pair of coaxial counterbores 44 and 45 that are provided in the right-hand end of this member 27, it being noted that the axis of these counterbores is off-set the distance X from the axis of this cartridge member 27.

As shown in FIGS. 2 and 3, a strainer device 46 comprises an annular strainer member 47 that has substantially the same diameter as the counterbore 44 and may be constructed of some suitable material such as, for example, felt, and a strainer retaining plate 48 secured thereto by such as a rivet 49. It will be understood that the strainer retaining plate 48 is a thin metallic annular member that has a plurality of radially extending fingers the distance between the tips of two diametrically oppositely arranged fingers being slightly in excess of the diameter of the counterbore 45 whereby those fingers are slightly bent when the strainer device 46 is placed in the assembled position shown in FIGS. 2 and 3. Accordingly, it will be understood that in their slightly bent condition the end of each finger exerts a thrust against the wall surface of the counterbore 45 to retain the strainer device 46 in the position in which it is shown in FIGS. 2 and 3.

As best shown in FIG. 4 of the drawings, a pair of identical resilient seal elements 50 are disposed between the two hereinbefore-mentioned legs 28 and 29. One of these seal elements 50 is shown in detail in FIGS. 8 and 9 of the drawings.

It will be noted from FIGS. 8 and 9 that the seal element 50, which may be constructed from, for example, rubber, constitutes a segment of a frustrum of a right circular cone. This segment has a flat face 51 from which a spherical sector 52 is removed for receiving in the cavity thus formed a spherical sector having the same size of the ball-type valve element 12. Furthermore, this segment constituting the seal element 50 is provided with a bore 53 that at one end opens into the cavity that constitutes the spherical sector 52 and at the other end at the conical outside surface on the segment of the frustrum of the right circular cone. It should be noted from FIG. 2 that the location of the bore 53 is such that in one of the seal elements 50 it is in alignment with the left-hand end of the passageway 11 in the casing 2 and in the other seal element 50 it is in alignment with that end of an outlet passageway 54 formed in the casing 2 that opens at the wall surface of the tapered counterbore 4.

Formed integral with the seal element 50 and extending outward from the flat face 51 thereof and forming a chosen angle therewith are a pair of spaced-apart tabs 55 and 56, it being noted from FIG. 9 that these tabs extend the entire length of this face 51. The shape, size and location of these tabs 55 and 56 are such that they fit into the notches 30 in the frusto-conical arcuate-shaped legs 28 and 29 as shown in FIGS. 4 to 7 inclusive. It will be further noted from FIGS. 4 to 7 inclusive, that the spherical surface provided by the removal of the spherical sector 52 from each seal element 50 abuts and forms a seal with the spherical surface of the ball valve element 12, and that the surface of each of these tabs that does not abut a side of a V-notch 30, and also the inside frusto-conical surface of the arcuate-shaped legs 28 and 29, are spaced apart from the spherical surface of this ball valve element to form a passageway through which fluid under pressure, after flowing past the check valve 40 (FIGS. 2 and 3) and through the choke 33, flows to passageways now to be described in the ball valve element 12.

As shown in FIGS. 2 to 7 inclusive of the drawings, the ball valve element 12 is provided with a bore or port 57 of large diameter, it being noted that the axis of this bore is at a right angle to and slightly off-set from the axis of the valve stem 14 which passes through the center of the ball valve element. Consequently, while the valve element 12 occupies the position shown in FIG. 5, fluid under pressure may flow from the passageway 11 directly to atmosphere via the bore 53 in each of the seal elements 50, the bore 57 in valve element 12, and outlet passageway 54 which extends through a wall 58 (FIG. 4) that has formed on its lower side a conical inner surface 59 against which rests a dished circular shield 60.

The shield 60 is preferably formed of a resilient material such as rubber and is held in place by any suitable means such as, for example, a pop rivet which comprises a metallic sleeve 61 that extends through coaxial bores in the shield 60 and the wall 58, and a stem 62 having at its upper end a ball-like head. when a pull is exerted on the stem by means of a mandrel (not shown), the ball-like head on the upper end of the stem acts to flare outward the upper end of the sleeve 61 until this ball-like head becomes encased therein, as shown in FIGS. 2 and 4, it being understood that the lower end of the sleeve 61 is concurrently flared outward by the mandrel until the opposite ends of the sleeve 61 are flared as shown in FIGS. 2 and 4. Subsequent to the flaring of the opposite ends of the sleeve 61 in the manner just explained, the continued pull on the stem 62 by the mandrel causes this stem to break just below the ball-like head which thereafter maintains the sleeve 61 in the position shown in FIGS. 2 and 4. The circumferential surface of the shield 60 is adapted to engage the conical surface 59 for preventing access to the passageway 54 of particles of foreign matter or by nest building insects such as, for example, mud wasp. It will be noted that the surface 59 on the wall 58 extends somewhat beyond the resilient shield 60 so as to provide adequate protection against the formation of ice over the opening in the frusto-conical cavity in the wall 58, and the shield 60 has sufficient area and flexibility to insure its displacement under the pressure of fluid released from the brake cylinder device to eject any foreign matter that might reach it.

In order to prevent movement of the handle 17 by vibration out of each of its three positions to which it may be manually moved by a trainman, this handle is provided with three pairs of diametrically arranged and arcuately spaced V-notches or indents 63 and 64, one pair of which appears in FIG. 3 of the drawings, corresponding to the three positions of the handle 17. Slidably mounted in each of a pair of diametrically arranged bottomed bores 65 and 66 provided in the casing 2 is a plunger 67 which is yieldingly urged into contact with a corresponding V-notch by a spring 68 interposed between the lower end of the respective plunger 67 and the end of the corresponding bottomed bore 65 or 66.

A slow blow-down of brake cylinder pressure to a chosen pressure above atmospheric pressure is provided when the ball valve element 12 is rotated to the position shown in FIG. 6. In this position of valve element 12, fluid under pressure may flow from the brake cylinder through the control valve device in its release position, the brake cylinder exhaust pipe, the bore in the pipe bracket to which the retaining valve device 1 is secured, strainer device 46 (FIGS. 2 and 3), annular valve seat member 37, past unseated check valve 40 which is unseated from its seat 38 against the yielding resistance of spring 41 by fluid under pressure acting on the lower side (FIG. 3) of this valve 40, counterbores 35 and 34, choke 33, the space between the inside frusto-conical surface of the arcuate-shaped legs 28 and 29 and the spherical surface of the ball valve element 12 (FIG. 6), a large bore or port 69 and a small bore or choke 70 provided in the ball valve element 12 each opening at one end into the bore 57 and at the other on the spherical surface of the valve element 12, bore 57, bore 53 in the lower (FIG. 6) seal element 50, passageway 54 and past the resilient shield 60 (FIGS. 2 and 4) to atmosphere.

In order to provide for a slow direct complete blow-down of fluid under pressure from the brake cylinder, the handle 17 may be turned to its slow direct position in which the pointer 21 (FIG. 1) overlies the indicium SD on member 20 and the ball valve element 12 occupies the position shown in FIG. 7. In this position of the ball valve element 12, fluid under pressure may flow from the brake cylinder through the choke 33 via the pathway hereinbefore described and thence to atmosphere via the space between the inside frusto-conical surface of the arcuate-shaped legs 28 and 29 and the spherical surface of the ball valve element 12 (FIG. 7), bores 57 and 69 in valve element 12, bore 53 in the lower (FIG. 7) seal element 50, passageway 54 and past the resilient shield 60 (FIGS. 2 and 3).

Moreover, in this position of the ball valve element 12, fluid under pressure may also flow from the brake cylinder through the strainer device 46 via the pathway hereinbefore described and thence to atmosphere via cavity 27a, passageway 11, bore 53 in upper seal element 50 (FIG. 7), choke 70, bore 57, bore 53 in lower seal element 50, passageway 54 and past the resilient shield 60.

It will be understood that the usual brake control valve device provided on railway vehicles is operative in the usual manner in effecting a brake release to vent fluid under pressure from the brake cylinder on the corresponding vehicle by way of the brake cylinder exhaust pipe that has one end connected to the pipe bracket to which the brake cylinder pressure retaining valve device 1 is secured by cap screws extending through the bores 8 in the flange 7.

This fluid under pressure from the brake cylinder may be released directly to atmosphere at a fast unrestricted rate, at a slow rate until a chosen pressure above atmospheric pressure is retained in the brake cylinder device, or at a slow rate until the pressure in the brake cylinder device is reduced to atmospheric pressure accordingly as the ball valve element 12 is positioned as shown in FIGS. 5, 6 and 7 by movement to these respective positions by the handle 17.

While the ball valve element 12 occupies its direct release position shown in FIG. 5, fluid under pressure from the brake cylinder device flows through the strainer device 46 (FIG. 2) and thence directly to atmosphere via cavity 27a, passageway 11, bores 53 and 57, passageway 54 and past the resilient shield 60 in addition to the flow through the choke 33 and the pathway hereinbefore described.

While the ball valve element 12 occupies its high pressure position shown in FIG. 6, fluid under pressure is released from the brake cylinder to atmosphere via the pathway hereinbefore described until a chosen pressure, for example, 20 pounds per square inch, dependent upon the strength of spring 41, is retained in the brake cylinder.

While the valve element 12 occupies its slow direct position shown in FIG. 7, fluid under pressure is completely released from the brake cylinder to atmosphere at a chosen slow rate, dependent upon the size of the two chokes 33 and 70, via the two parallel pathways hereinbefore described, it being understood that one of these two chokes is disposed in each of these pathways.

Having now described the invention, what I claim as new and desire to secure by Letters Patent, is:

1. A brake cylinder pressure retaining valve device comprising:
   a. a casing having a bore, a first counterbore, a second counterbore, an inlet port in communication with said second counterbore via which fluid under pressure from a brake cylinder is admitted to said second counterbore, a passageway connecting said first and second counterbores, and an outlet port via which fluid under pressure is released to atmosphere,
   b. a removable cartridge member comprising:
      i. an element disposed in said second counterbore and having extending therethrough a bore of such size as to constitute a choke and a plurality of counterbores, and
      ii. a pair of spaced-apart legs integral with said element and so disposed as to be received in said first counterbore in said casing,
   c. a check valve device carried by said element and comprising:
      i. a valve seat element disposed in one of said plurality of counterbores in said element,
      ii. a check valve disposed in another of said plurality of counterbores in said element and interposed between said valves seat element and said choke, and
      iii. biasing means interposed between said element and said check valve for normally biasing it in the direction of said valve seat element whereby said check valve device and said choke are arranged in series relation,
   d. a pair of seal elements each having a port therein and so disposed in said first counterbore in said casing between said legs that the ports therein register respectively with one end of said passageway and with said outlet port, and
   e. a spherical valve element having therein a plurality of ports of different cross-sectional area certain of which intersect each other, said valve element being disposed in sealing relationship with said seal elements and between said legs in spaced-apart relationship thereto to provide passageways between said choke in said element and said ports in said valve element, said valve element having one position in which said inlet port communicates with said outlet port via a pair of parallel passageways, one of which includes said check valve device, said choke, said passageways provided between said legs and said valve element, and said ports in said valve element, and the other of which includes said passageway in said casing, and being rotatable out of said one position to a first different position in which said inlet port communicates with said outlet port only via said one passageway of said pair of parallel passageways to release fluid under pressure to atmosphere at a restricted rate down to a chosen low pressure determined by the force of said biasing means seating said check valve on said valve seat element, and being rotatable out of said first different position to a second different position in which said inlet port communicates with said outlet port via a second pair of parallel passageways one of which includes said one passageway of said first pair of parallel passageways and the other of which includes said passageway in said casing and one of said plurality of ports of different cross-sectional area in said valve element, the size of which port constitutes a choke to release fluid under pressure to atmosphere at a restricted rate.

2. A brake cylinder pressure retaining valve device, as recited in claim 1, further characterized in that said first counterbore in said casing is coaxial with said bore therein, and said second counterbore in said casing is off-set from and tangent to said first counterbore.

3. A brake cylinder pressure retaining valve device, as recited in claim 1, further characterized in that said element of said cartridge member comprises a frustum of a right circular cone.

4. A brake cylinder pressure retaining valve device, as recited in claim 1, further characterized in that each of said legs of said cartridge member has spaced-apart inner and outer surfaces, each surface constituting a portion of the surface of a frustum of a right circular cone.

5. A brake cylinder pressure retaining valve device, as recited in claim 1, further characterized in that said element of said cartridge member comprises a frustum of a right circular cone, and that each of said legs of said cartridge member has spaced-apart inner and outer surfaces, each surface constituting a portion of the surface of a frustum of a right circular cone, said legs being integral with one end of said element and so disposed with respect thereto that said outer frusto-conical surface thereon abuts the wall of said first counterbore in said casing.

6. A brake cylinder pressure retaining valve device, as recited in claim 1, further characterized in that the axis of said cartridge member andd the and of rotation of said spherical valve element are parallel, and the axis of said ports in said spherical valve element lie in a common plane that is at substantially a right angle to said axes.

7. A brake cylinder pressure retaining valve device, as recited in claim 1, further characterized in that each of said seal elements comprises a segment of a frustrum of a right circular cone.

8. A brake cylinder pressure retaining valve device, as recited in claim 1, further characterized in that each of said seal elements comprises a segment of a frustrum of a right circular cone having an inner and an outer surface, said inner surface being planar and said outer surface constituting a portion of the surface of said frustrum of a right circular cone.

9. A brake cylinder pressure retaining valve device, as recited in claim 1, further characterized in that each of said seal elements comprises a segment of a frustum of a right circular cone having an inner and an outer surface, said inner surface being planar and having formed therein a cavity that constitutes a spherical sector to receive a corresponding spherical sector of said spherical valve element.

10. A brake cylinder pressure retaining valve device, as recited in claim 1, further characterized by manually operable means for turning said spherical valve element from one to another of its positions, and resilient detent means for retaining said manually operable means in each of said positions against movement therefrom in response to vibration of said retaining valve device.

11. A brake cylinder pressure retaining valve device, as recited in claim 5, further characterized in that each of said legs has formed therein between the adjacent opposite ends of said inner and outer surfaces a notch, and each of said seal elements comprises a segment of a frustrum of a right circular cone having an inner planar surface and a pair of spaced-apart tabs extending from said surface, said tabs being so disposed that one is received in one of the notches in one of said pair of legs and the other is received in one of the notches in the other leg.

12. A brake cylinder pressure retaining valve device, as recited in claim 9, further characterized in that the axis of said spherical sector constituting the cavity in each of said seal elements coincides with the axis of said port therein which port extends from said outer surface to said cavity.

* * * * *

PO-1050
(5/69)

UNITED STATES PATENT OFFICE
CERTIFICATE OF CORRECTION

Patent No. 3,794,071    Dated February 26, 1974

Inventor(s) Daniel G. Scott

It is certified that error appears in the above-identified patent and that said Letters Patent are hereby corrected as shown below:

Column 8, line 20, "valves" should be --valve--

Column 9, line 26, "andd", first occurrence, should be --and-- line 26, "and", second occurrence, should be --axis--

Signed and sealed this 24th day of September 1974.

(SEAL)
Attest:

McCOY M. GIBSON JR.
Attesting Officer

C. MARSHALL DANN
Commissioner of Patents